United States Patent
Chen et al.

(10) Patent No.: US 11,863,071 B2
(45) Date of Patent: Jan. 2, 2024

(54) POWER CONVERTER HAVING SMOOTH TRANSITION CONTROL MECHANISM

(71) Applicant: ANPEC ELECTRONICS CORPORATION, Hsinchu (TW)

(72) Inventors: Chien-Nan Chen, Hsinchu (TW); Fu-Chuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 110 days.

(21) Appl. No.: 17/670,509

(22) Filed: Feb. 14, 2022

(65) Prior Publication Data

US 2023/0208299 A1    Jun. 29, 2023

(30) Foreign Application Priority Data

Dec. 24, 2021    (TW) ................................. 110148568

(51) Int. Cl.
*H02M 3/158*    (2006.01)
*H02M 1/00*    (2006.01)
*H02M 1/08*    (2006.01)

(52) U.S. Cl.
CPC .......... *H02M 3/158* (2013.01); *H02M 1/0041* (2021.05); *H02M 1/08* (2013.01)

(58) Field of Classification Search
CPC .... H02M 3/156; H02M 3/1563; H02M 3/157; H02M 3/158; H02M 3/1586; H02M 1/0041; H02M 1/08
See application file for complete search history.

(56) References Cited

U.S. PATENT DOCUMENTS

| 10,756,627 | B2 | 8/2020 | Hsu et al. | |
| 2009/0237053 | A1* | 9/2009 | Gan | H02M 3/156 323/283 |
| 2009/0243580 | A1* | 10/2009 | Chen | H02M 3/156 323/288 |
| 2012/0161738 | A1* | 6/2012 | Nakashima | H02M 3/158 323/284 |

FOREIGN PATENT DOCUMENTS

TW    201933745 A    8/2019

* cited by examiner

*Primary Examiner* — Nguyen Tran
(74) *Attorney, Agent, or Firm* — Li & Cai Intellectual Property Office

(57) ABSTRACT

A power converter having a smooth transition control mechanism is provided. An oscillator circuit outputs a clock signal. A control circuit receives the clock signal from the oscillator circuit and outputs a control signal based on the clock signal. A driver circuit outputs a high-side conduction signal and a low-side conduction signal according to the control signal. A high-side switch is turned on or off according to the high-side conduction signal from the driver circuit. A low-side switch is turned on or off according to the low-side conduction signal from the driver circuit. The oscillator circuit receives the high-side conduction signal from the driver circuit. The oscillator circuit, according to the high-side conduction signal, determines whether or not the clock signal outputted to the control circuit needs to be adjusted.

9 Claims, 5 Drawing Sheets

POWER CONVERTER HAVING SMOOTH TRANSITION CONTROL MECHANISM

CROSS-REFERENCE TO RELATED PATENT APPLICATION

This application claims the benefit of priority to Taiwan Patent Application No. 110148568, filed on Dec. 24, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter having a smooth transition control mechanism.

BACKGROUND OF THE DISCLOSURE

Power converters are used to convert voltages and supply the converted voltages to other electronic devices as power required for operation of the other electronic devices. An output current of the power converter changes with changes in on-times of a high-side switch and a low-side switch of the power converter. However, a conventional control circuit cannot control the high-side switch and the low-side switch of the power converter to operate well. As a result, the power converter outputs the output current having a too large or small value, which causes damages in a load and the circuit components of the power convertor.

SUMMARY OF THE DISCLOSURE

In response to the above-referenced technical inadequacies, the present disclosure provides a power converter having a smooth transition control mechanism. The power converter includes an oscillator circuit, a control circuit, a driver circuit, a high-side switch and a low-side switch. The oscillator circuit is configured to output a clock signal. The control circuit is connected to the oscillator circuit. The control circuit is configured to receive the clock signal from the oscillator circuit and to output a control signal based on the clock signal. The driver circuit is connected to the control circuit and the oscillator circuit. The driver circuit is configured to output a high-side conduction signal and a low-side conduction signal. A first terminal of the high-side switch is coupled to a common voltage. A control terminal of the high-side switch is connected to the driver circuit. The high-side switch is turned on or off according to the high-side conduction signal from the driver circuit. A first terminal of the low-side switch is connected to a second terminal of the high-side switch. A second terminal of the low-side switch is grounded. A node between the first terminal of the low-side switch and the second terminal of the high-side switch is connected to a first terminal of an inductor. A second terminal of the inductor is connected to a first terminal of an output capacitor. A second terminal of the output capacitor is grounded. A control terminal of the low-side switch is connected to the driver circuit. The low-side switch is turned on or off according to the low-side conduction signal from the driver circuit. The oscillator circuit, according to the high-side conduction signal from the driver circuit, determines whether or not the clock signal outputted to the control circuit needs to be adjusted.

In certain embodiments, when a time point at which the high-side conduction signal transits from a high level to a low level is later than a transition time point of the clock signal, the oscillator circuit adjusts a frequency of the clock signal.

In certain embodiments, when the time point at which the high-side conduction signal transits from the high level to the low level is not later than the transition time point of the clock signal, the oscillator circuit does not adjust the clock signal.

In certain embodiments, when the time point at which the high-side conduction signal transits from the high level to the low level is later than the transition time point of the clock signal, the oscillator circuit reduces the frequency of the clock signal.

In certain embodiments, when the time point at which the high-side conduction signal transits from the high level to the low level is later than the transition time point of the clock signal, the oscillator circuit delays a pulse wave of the clock signal such that a time point at which the pulse wave of the clock signal appears is later than the time point at which the high-side conduction signal transits from the high level to the low level.

In certain embodiments, the transition time point is a time point of a falling edge of a pulse wave of the clock signal.

In certain embodiments, the oscillator circuit includes a comparator. A first input terminal of the comparator is connected to a first terminal of an input capacitor. The first terminal of the input capacitor is connected to a current source. A second terminal of the input capacitor is grounded. A second input terminal of the comparator is coupled to a reference voltage. A third input terminal of the comparator is connected to an output terminal of the driver circuit and receives the high-side conduction signal. An output terminal of the comparator is connected to an input terminal of the control circuit and outputs the clock signal to the control circuit.

In certain embodiments, the oscillator circuit further includes a voltage divider circuit. An input terminal of the voltage divider circuit is coupled to an input voltage. An output terminal of the voltage divider circuit is connected to the second input terminal of the comparator.

In certain embodiments, the voltage divider circuit includes a first resistor and a second resistor. A first terminal of the first resistor is coupled to the input voltage. A second terminal of the first resistor is connected to a first terminal of the second resistor. A second terminal of the second resistor is grounded. A node between the second terminal of the first resistor and the first terminal of the second resistor is connected to the second input terminal of the comparator.

In certain embodiments, the power converter further includes an error amplifier. A first input terminal of the error amplifier is connected to a node between the second terminal of the inductor and the first terminal of the output capacitor. A second input terminal of the error amplifier is coupled to a reference voltage. An output terminal of the error amplifier is connected to the control circuit. The control circuit outputs the control signal according to an error amplified signal outputted by the error amplifier.

As described above, the present disclosure provides the power converter having the smooth transition control mechanism. The frequency of the clock signal can be adjusted appropriately according to energy that the power convertor needs to supply. The control circuit controls the driver circuit to turn on or off the high-side switch and the low-side switch based on the adjusted frequency of the clock signal in real time, thereby efficiently preventing a large ripple wave from appearing in the output voltage of the power converter. Therefore, the output voltage of the power converter can be maintained at a constant value and cannot drop to a very low value.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
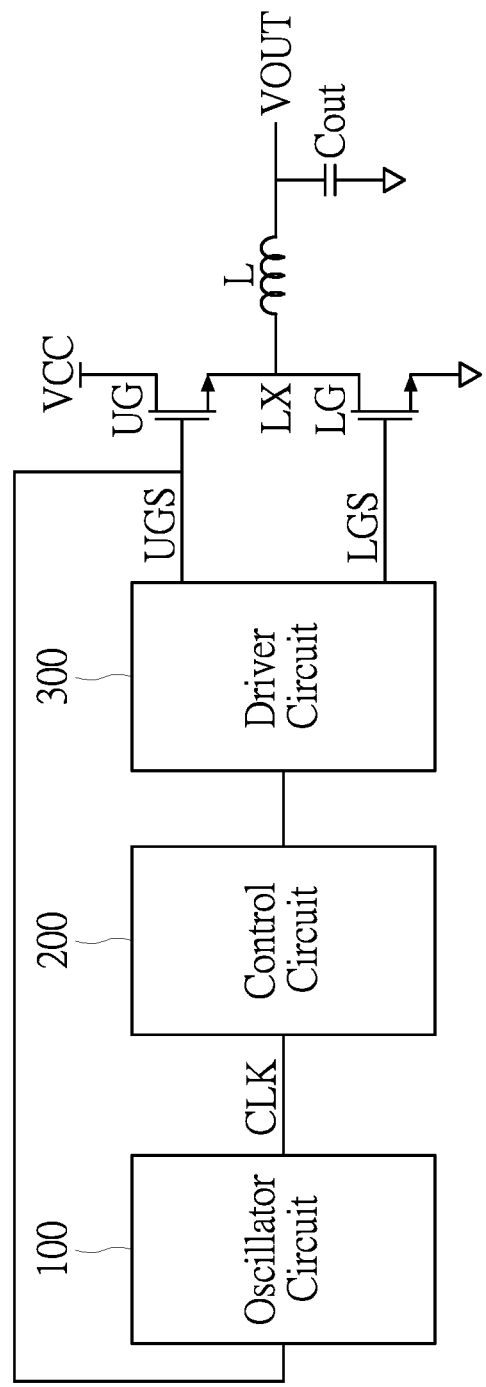
FIG. 1 is a block diagram of a power converter having a smooth transition control mechanism according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 3:
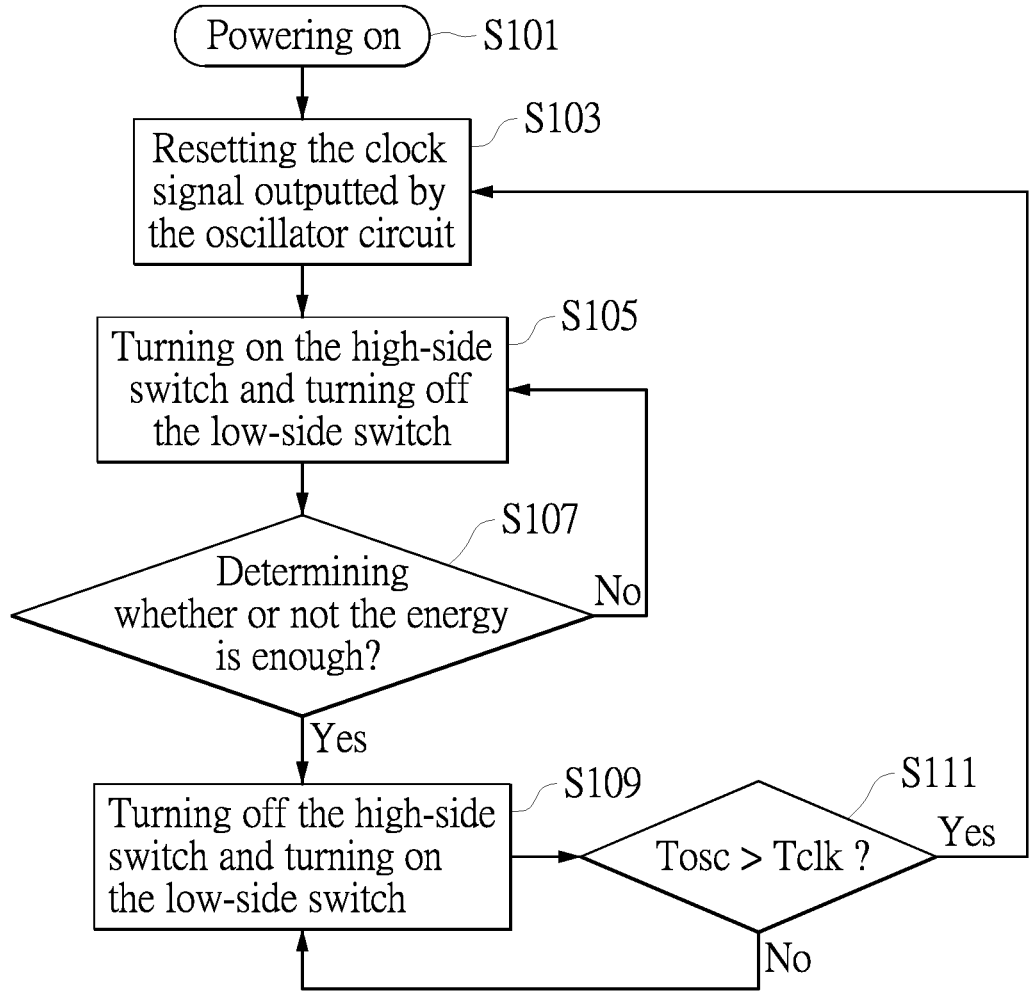
FIG. 3 is a flowchart diagram of steps of the power converter having the smooth transition control mechanism according to the embodiment of the present disclosure.

Reference is made to FIGS. 1 and 3, in which FIG. 1 is a block diagram of a power converter having a smooth transition control mechanism according to an embodiment of the present disclosure, and FIG. 3 is a flowchart diagram of steps of the power converter having the smooth transition control mechanism according to the embodiment of the present disclosure.

The power convertor of the embodiment of the present disclosure may include an oscillator circuit 100, a control circuit 200, a driver circuit 300, a high-side switch UG and a low-side switch LG as shown in FIG. 1. The control circuit 200 may be connected to the oscillator circuit 100 and the driver circuit 300. The driver circuit 300 may be connected to a control terminal of the high-side switch UG, a control terminal of the low-side switch LG and the oscillator circuit 100.

A first terminal of the high-side switch UG is coupled to a common voltage VCC. A first terminal of the low-side switch LG may be connected to a second terminal of the high-side switch UG. A second terminal of the low-side switch LG may be grounded. A node LX between the first terminal of the low-side switch LG and the second terminal of the high-side switch UG may be connected to a first terminal of an inductor L. A second terminal of the inductor L may be connected to a first terminal of an output capacitor Cout. A second terminal of the output capacitor Cout may be grounded. A node between the second terminal of the inductor L and the first terminal of the output capacitor Cout may be an output terminal of the power convertor. The output terminal of the power convertor supplies an output voltage VOUT.

Steps 101 to S111 are shown in FIG. 3 and applicable to performed on the power converter of the embodiment of the present disclosure as shown in FIG. 1, which is specifically described in the following.

In step S101, the power convertor is powered on.

In step S103, the oscillator circuit 100 outputs a clock signal CLK to the control circuit 200.

In step S105, the control circuit 200 outputs a control signal to the driver circuit 300 based on the clock signal CLK. The driver circuit 300, according to the control signal, outputs a high-side conduction signal UGS at a first level such as a high level to the high-side switch UG to turn on the high-side switch UG. The driver circuit 300, according to the control signal, outputs a low-side conduction signal LGS at a second level such as a low level to the low-side switch LG to turn off the low-side switch LG.

In step S107, the control circuit 200 of the power convertor determines whether or not the output voltage VOUT supplied from the power convertor to an electronic device connected to the power convertor is enough for operation of the electronic device. If the power convertor does not supply enough energy to the electronic device, step S105 is continually performed. In step S105, the high-side switch UG is turned on and the low-side switch LG is turned off. Conversely, if the power convertor supplies enough energy to the electronic device, step S109 is performed.

In step S109, the driver circuit 300, according to the control signal, outputs the high-side conduction signal UGS at the second level such as the low level to the high-side switch UG to turn off the high-side switch UG. The driver circuit 300, according to the control signal, outputs the low-side conduction signal LGS at the first level such as the high level to the low-side switch LG to turn on the low-side switch LG.

It is worth noting that, the oscillator circuit 100 may receive the high-side conduction signal UGS from the driver circuit 300. Then, the oscillator circuit 100 may, according to the high-side conduction signal UGS, determine whether or not the clock signal CLK outputted to the control circuit 200 needs to be adjusted to change an on-time of the high-side switch UG and an on-time of the low-side switch LG. For example, the oscillator circuit 100 may adjust a frequency of the clock signal CLK or time points at which one or more of pulse waves of the clock signal CLK appear.

For example, in step S111, the oscillator circuit 100 may determine whether or not a time point Tosc at which the high-side conduction signal UGS transits from the high level to the low level is later than a transition time point Tclk of one of the pulse waves of the clock signal CLK. In the embodiment, the transition time point Tclk of the one of the pulse waves of the clock signal CLK may be a time point of a falling edge of the one of the pulse waves of the clock signal CLK, but the present disclosure is not limited thereto. In practice, the transition time point Tclk of the one of the pulse waves of the clock signal CLK may be a time point of a rising edge of the one of the pulse waves of the clock signal CLK.

If the oscillator circuit 100 determines that the time point Tosc at which the high-side conduction signal UGS transits from the high level to the low level is not later than the transition time point Tclk of the one of the pulse waves of the clock signal CLK, the oscillator circuit 100 does not adjust the frequency of the clock signal CLK.

Conversely, when the oscillator circuit 100 determines that the time point Tosc at which the high-side conduction signal UGS transits from the high level to the low level is later than the transition time point Tclk of the one of the pulse waves of the clock signal CLK, the oscillator circuit 100 may adjust the frequency of the clock signal CLK. For example, the oscillator circuit 100 may reduce the frequency of the clock signal CLK.

When the oscillator circuit 100 determines that the time point Tosc at which the high-side conduction signal UGS transits from the high level to the low level is later than the transition time point Tclk of the one of the pulse waves of the clock signal CLK, the oscillator circuit 100 may delay the one of the pulse waves of the clock signal CLK such that a time point at which the one of the pulse waves of the clock signal CLK appears is later than the time point Tosc at which the high-side conduction signal UGS transits from the high level to the low level.

Figure 2:
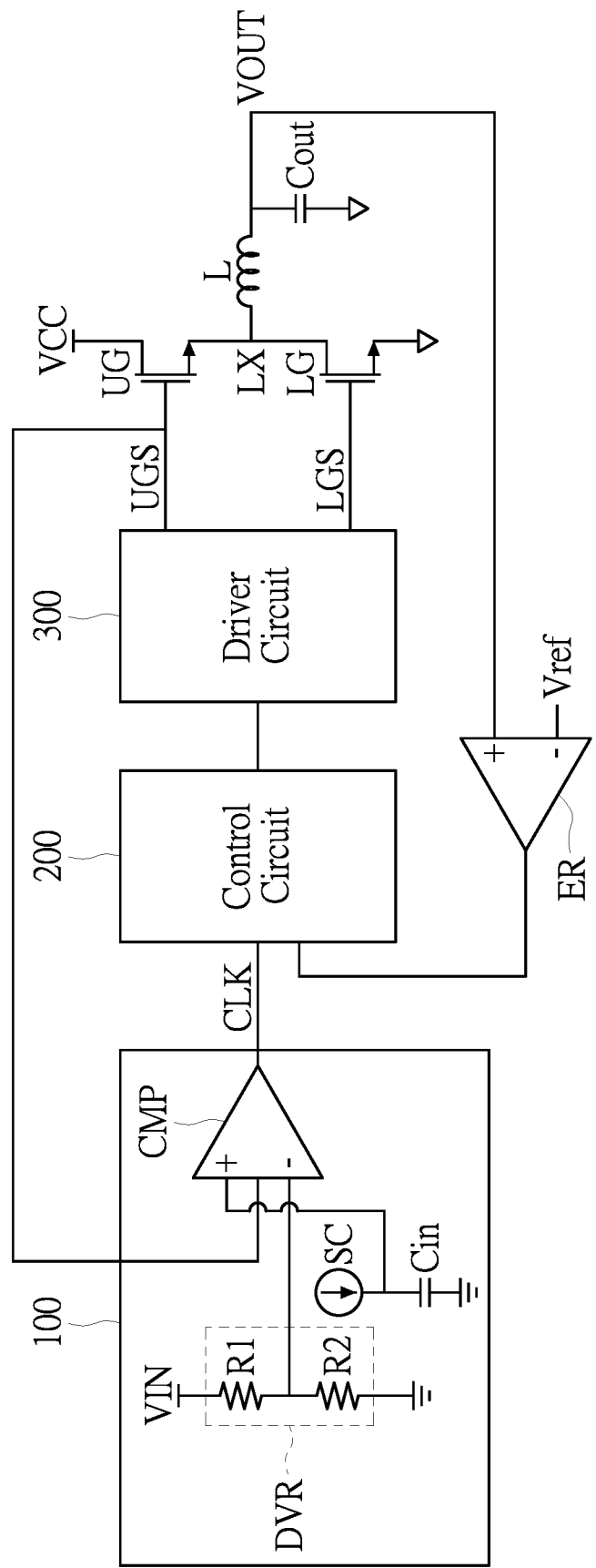
FIG. 2 is a block diagram of the power converter having the smooth transition control mechanism according to the embodiment of the present disclosure.

Reference is made to FIG. 2, which is a block diagram of the power converter having the smooth transition control mechanism according to the embodiment of the present disclosure.

In the embodiment, the oscillator circuit 100 of the power converter may include a comparator CMP, a current source SC and an input capacitor Cin.

A first input terminal such as a non-inverting input terminal of the comparator CMP may be connected to a first terminal of the input capacitor Cin. The first terminal of the input capacitor Cin may be connected to the current source SC. A second terminal of the input capacitor Cin may be grounded. A second input terminal such as an inverting input terminal of the comparator CMP may be coupled to a reference voltage.

If necessary, the oscillator circuit 100 may further include a voltage divider circuit DVR. An input terminal of the voltage divider circuit DVR is coupled to an input voltage VIN. An output terminal of the voltage divider circuit DVR may be connected to the second input terminal of the comparator CMP. The voltage divider circuit DVR may output the reference voltage as described above to the second input terminal such as the inverting input terminal of the comparator CMP.

For example, the voltage divider circuit DVR may include a first resistor R1 and a second resistor R2. A first terminal of the first resistor R1 is coupled to the input voltage VIN. A second terminal of the first resistor R1 may be connected to a first terminal of the second resistor R2. A second terminal of the second resistor R2 may be grounded. A node between the second terminal of the first resistor R1 and the first terminal of the second resistor R2 may be connected to the second input terminal of the comparator CMP. A voltage of the node between the second terminal of the first resistor R1 and the first terminal of the second resistor R2 may be the reference voltage coupled to the second input terminal such as the inverting input terminal of the comparator CMP as described above.

It is worth noting that, a third input terminal of the comparator CMP may be connected to an output terminal of the driver circuit 300 and receive the high-side conduction signal UGS. An output terminal of the comparator CMP may be connected to an input terminal of the control circuit 200. The comparator CMP may output the clock signal CLK signal to the control circuit 200, according to a voltage of the first input terminal of the comparator CMP, a voltage of the second input terminal of the comparator CMP and the high-side conduction signal UGS.

The power convertor of the embodiment of the present disclosure may include a feedback circuit. The feedback circuit is configured to feedback the output voltage Vout of the power convertor (or other related data such as a voltage divided from the output voltage Vout of the power convertor) to the control circuit 200. For example, the feedback circuit may include an error amplifier ER. A first input terminal (such as a non-inverting input terminal) of the error amplifier ER may be connected to the node between the second terminal of the inductor L and the first terminal of the output capacitor Cout. A second input terminal (such as an inverting input terminal) of the error amplifier ER may be coupled to a reference voltage Vref. An output terminal of the error amplifier ER may be connected to an input terminal of the control circuit 200.

The error amplifier ER may amplify a difference between a voltage of the first input terminal of the error amplifier ER and a voltage of the second input terminal of the error amplifier ER to output an error amplified signal to the control circuit 200. The control circuit 200 may output the control signal to the driver circuit 300 according to the error amplified signal from the error amplifier ER and the clock signal CLK from the comparator CMP of the oscillator circuit 100.

Figure 4:
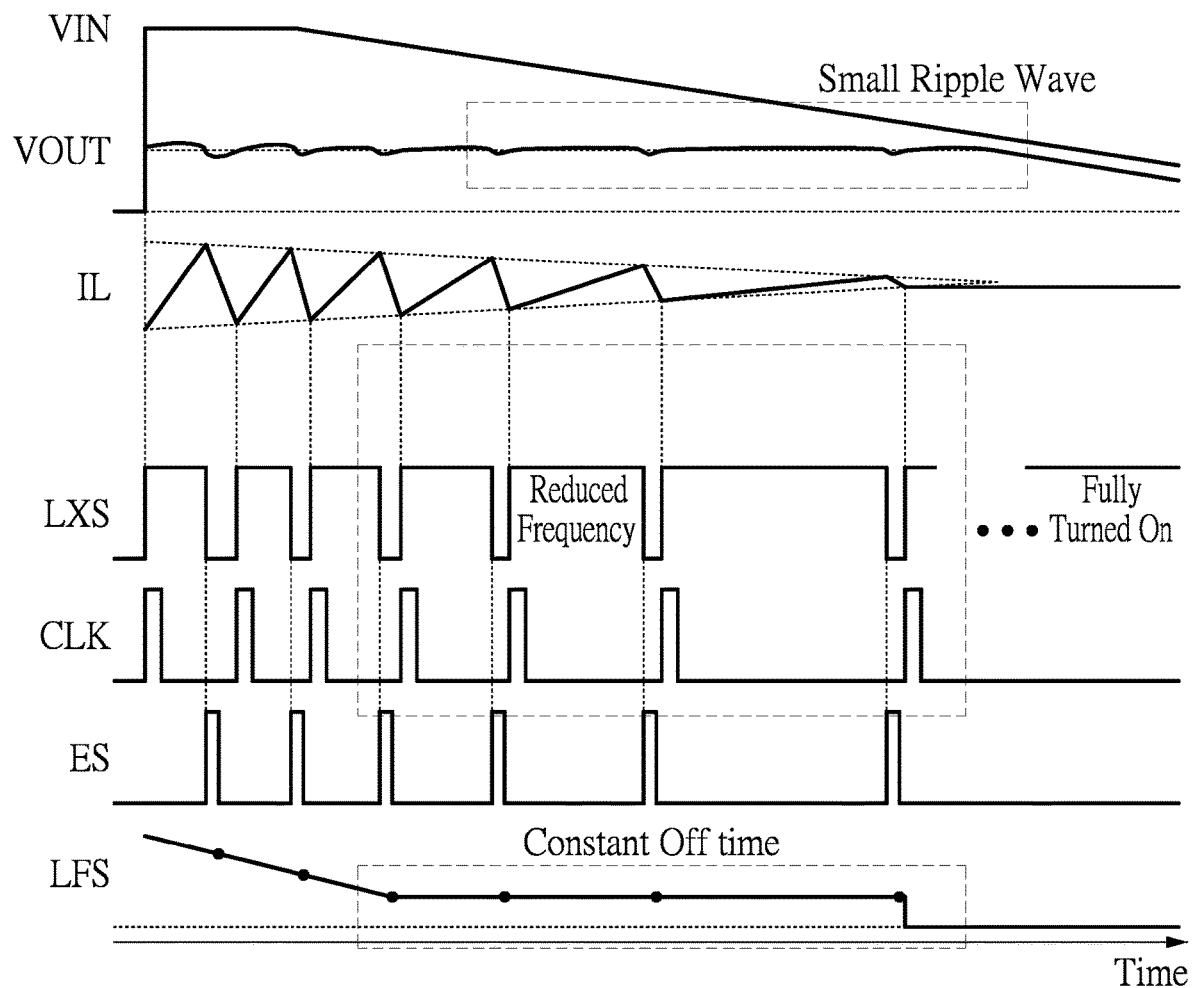
FIG. 4 is a waveform diagram of signals of the power converter having the smooth transition control mechanism according to the embodiment of the present disclosure.
Figure 5:
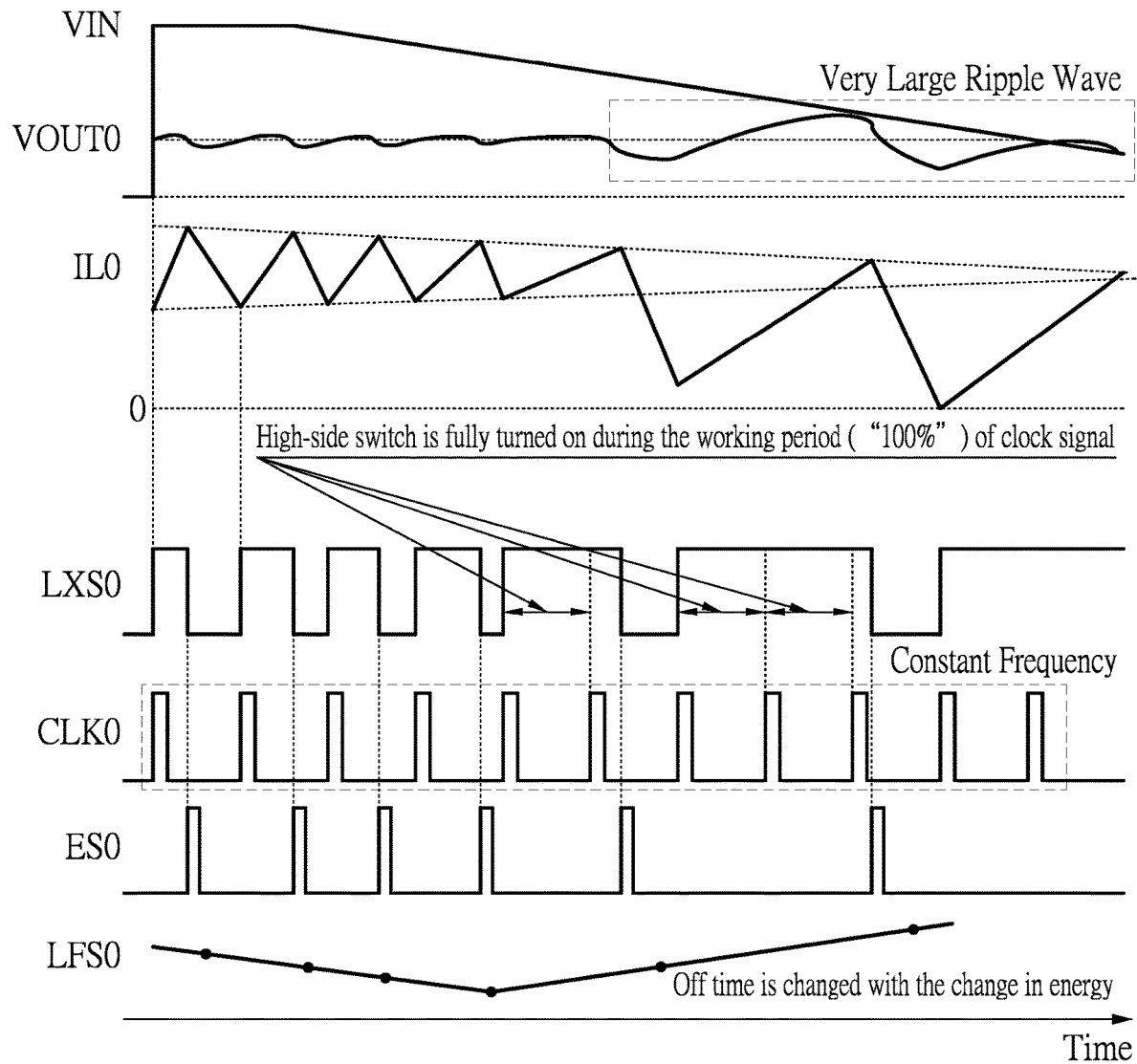
FIG. 5 is a waveform diagram of signals of a conventional power converter.

Reference is made to FIGS. 1, 4 and 5, in which FIG. 4 is a waveform diagram of signals of the power converter having the smooth transition control mechanism according to the embodiment of the present disclosure, and FIG. 5 is a waveform diagram of signals of a conventional power converter.

As shown in FIG. 5, VIN represents the input voltage of the conventional power converter, VOUT0 represents an output voltage of the conventional power converter, and IL0 represents a current flowing through an inductor of the conventional power converter. In addition, LXS0 represents a node signal at a node between of a second terminal of a high-side switch of the conventional power converter and a first terminal of a low-side switch of the conventional power converter, and CLK0 represents a clock signal of the conventional power converter. In addition, ES0 represents an error amplified signal of an error amplifier of the conventional power converter, and LFS0 represents an energy signal at the node between of the second terminal of the high-side switch of the conventional power converter and the first terminal of the low-side switch of the conventional power converter.

As shown in FIG. 5, a frequency of the clock signal CLK0 of the conventional power converter is a constant value such that an off time of the energy signal LFS0 of the conventional power converter changes randomly with a change in energy. As a result, a very large ripple wave appears in the output voltage VOUT0 of the conventional power converter.

As shown in FIG. 4, VIN represents the input voltage of the power converter of the present disclosure, VOUT represents the output voltage of the power converter of the present disclosure, and IL represents a current flowing through the inductor L of the power converter of the present disclosure. In addition, LXS represents a node signal at the node LX between of the second terminal of the high-side switch UG of the power converter of the present disclosure and the first terminal of the low-side switch LG of the power converter of the present disclosure, and CLK represents the clock signal that is received by the control circuit 200 from the oscillator circuit 100 in the power converter of the present disclosure. In addition, ES represents the error amplified signal of the error amplifier of the power converter ER of the present disclosure, and LFS represents an energy signal at the node LX between of the second terminal of the high-side switch UG of the power converter of the present disclosure and the first terminal of the low-side switch LG of the power converter of the present disclosure.

As shown in FIG. 4, a time required for the power converter of the present disclosure to supply the node signal LXS having enough energy (that is, a time during which the high-side switch UG needs to be turned on) may be larger than a time between two ones of the pulse waves of the clock signal CLK. Under this condition, the oscillator circuit 100 reduces the frequency of the clock signal CLK supplied to the control circuit 200 such that the frequency of the clock signal CLK is not a constant value while an off time of the energy signal LFS is a constant value. As a result, the output voltage VOUT supplied by the power converter of the present disclosure is a stable value, and only small a ripple wave appears in the output voltage VOUT of the power converter of the present disclosure.

In summary, the present disclosure provides the power converter having the smooth transition control mechanism. The frequency of the clock signal can be adjusted appropriately according to the energy that the power convertor needs to supply. The control circuit controls the driver circuit to turn on or off the high-side switch and the low-side switch based on the adjusted frequency of the clock signal in real time, thereby efficiently preventing a large ripple wave from appearing in the output voltage of the power converter. Therefore, the output voltage of the power converter can be maintained at a constant value and cannot drop to a very low value.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter having a smooth transition control mechanism, comprising:
an oscillator circuit configured to output a clock signal;
a control circuit connected to the oscillator circuit, and configured to receive the clock signal from the oscillator circuit and to output a control signal based on the clock signal;
a driver circuit connected to the control circuit and the oscillator circuit, and configured to output a high-side conduction signal and a low-side conduction signal;
a high-side switch, wherein a first terminal of the high-side switch is coupled to a common voltage, a control terminal of the high-side switch is connected to the driver circuit, and the high-side switch is turned on or off according to the high-side conduction signal from the driver circuit; and
a low-side switch, wherein a first terminal of the low-side switch is connected to a second terminal of the high-side switch, a second terminal of the low-side switch is grounded, a node between the first terminal of the low-side switch and the second terminal of the high-side switch is connected to a first terminal of an inductor, a second terminal of the inductor is connected to a first terminal of an output capacitor, a second terminal of the output capacitor is grounded, a control terminal of the low-side switch is connected to the driver circuit, and the low-side switch is turned on or off according to the low-side conduction signal from the driver circuit;
wherein, the oscillator circuit, according to the high-side conduction signal from the driver circuit, determines whether or not the clock signal outputted to the control circuit needs to be adjusted;
wherein, when the time point at which the high-side conduction signal transits from a high level to a low level is later than a transition time point of the clock signal, the oscillator circuit delays a pulse wave of the clock signal such that a time point at which the pulse wave of the clock signal appears is later than the time point at which the high-side conduction signal transits from the high level to the low level.

2. The power converter according to claim 1, wherein, when a time point at which the high-side conduction signal transits from the high level to the low level is later than the transition time point of the clock signal, the oscillator circuit adjusts a frequency of the clock signal.

3. The power converter according to claim 2, wherein, when the time point at which the high-side conduction signal transits from the high level to the low level is not later than the transition time point of the clock signal, the oscillator circuit does not adjust the clock signal.

4. The power converter according to claim 2, wherein, when the time point at which the high-side conduction signal transits from the high level to the low level is later than the transition time point of the clock signal, the oscillator circuit reduces the frequency of the clock signal.

5. The power converter according to claim 2, wherein the transition time point is a time point of a falling edge of the pulse wave of the clock signal.

6. The power converter according to claim 1, wherein, the oscillator circuit includes a comparator, a first input terminal of the comparator is connected to a first terminal of an input capacitor, the first terminal of the input capacitor is connected to a current source, a second terminal of the input capacitor is grounded, a second input terminal of the comparator is coupled to a reference voltage, a third input terminal of the comparator is connected to an output terminal of the driver circuit and receives the high-side conduction signal, and an output terminal of the comparator is connected to an input terminal of the control circuit and outputs the clock signal to the control circuit.

7. The power converter according to claim 6, wherein the oscillator circuit further includes a voltage divider circuit, an input terminal of the voltage divider circuit is coupled to an input voltage, and an output terminal of the voltage divider circuit is connected to the second input terminal of the comparator.

8. The power converter according to claim 7, wherein the voltage divider circuit includes a first resistor and a second resistor, a first terminal of the first resistor is coupled to the input voltage, a second terminal of the first resistor is connected to a first terminal of the second resistor, a second terminal of the second resistor is grounded, and a node between the second terminal of the first resistor and the first terminal of the second resistor is connected to the second input terminal of the comparator.

9. The power converter according to claim 1, further comprising:
an error amplifier, wherein a first input terminal of the error amplifier is connected to a node between the second terminal of the inductor and the first terminal of the output capacitor, a second input terminal of the error amplifier is coupled to a reference voltage, an output terminal of the error amplifier is connected to the control circuit, and the control circuit outputs the control signal according to an error amplified signal outputted by the error amplifier.

\* \* \* \* \*